United States Patent
Cho (10) Patent No.: US 11,775,170 B2
(45) Date of Patent: Oct. 3, 2023

(54) REMOTE CONTROL SYSTEM FOR CONSTRUCTION EQUIPMENT

(71) Applicant: Hyundai Construction Equipment Co., Ltd., Seoul (KR)

(72) Inventor: Beom Soo Cho, Seoul (KR)

(73) Assignee: Hyundai Construction Equipment Co., Ltd., Seoul (KR)

( * ) Notice: Subject to any disclaimer, the term of this patent is extended or adjusted under 35 U.S.C. 154(b) by 0 days.

(21) Appl. No.: 18/086,329

(22) Filed: Dec. 21, 2022

(65) Prior Publication Data

US 2023/0195305 A1 Jun. 22, 2023

(30) Foreign Application Priority Data

Dec. 22, 2021 (KR) .......... 10-2021-0185481

(51) Int. Cl.
| | | |
|---|---|---|
| G06F 3/04886 | (2022.01) | |
| G05D 1/00 | (2006.01) | |
| G06F 3/01 | (2006.01) | |

(52) U.S. Cl.
CPC ......... G06F 3/04886 (2013.01); G05D 1/005 (2013.01); G05D 1/0016 (2013.01); G06F 3/016 (2013.01)

(58) Field of Classification Search
CPC .. G05D 1/0016; G05D 1/005; G06F 3/04886; G06F 3/016
See application file for complete search history.

(56) References Cited

U.S. PATENT DOCUMENTS

| | | | | |
|---|---|---|---|---|
| 6,836,982 | B1* | 1/2005 | Augustine | E02F 9/205 |
| | | | | 701/50 |
| 2008/0133094 | A1* | 6/2008 | Stanek | E02F 9/26 |
| | | | | 37/468 |
| 2014/0268541 | A1* | 9/2014 | Coombs | A61B 1/0004 |
| | | | | 361/679.41 |
| 2018/0011538 | A1* | 1/2018 | Rihn | G06F 3/016 |
| 2018/0058039 | A1* | 3/2018 | Fredrickson | G05G 5/05 |
| 2021/0276848 | A1* | 9/2021 | Miller | B66F 9/12 |
| 2022/0081873 | A1* | 3/2022 | Huissoon | E02F 3/437 |
| 2023/0016842 | A1* | 1/2023 | Eckelberg | G06F 3/03547 |

FOREIGN PATENT DOCUMENTS

| | | |
|---|---|---|
| CN | 213338437 U | 6/2021 |
| JP | 2020-101087 A | 7/2020 |
| KR | 10-2015-0025011 A | 3/2015 |
| KR | 10-2017-0126225 A | 11/2017 |
| KR | 10-2017-0138740 A | 12/2017 |
| KR | 10-2019-0017010 A | 2/2019 |
| KR | 10-2016681 B1 | 8/2019 |
| KR | 10-2051180 B1 | 12/2019 |

OTHER PUBLICATIONS

Notice of Allowance for Korean Patent Application No. 10-2021-0185481 issued by the Korean Patent Office dated Feb. 15, 2023.

* cited by examiner

*Primary Examiner* — Tadesse Hailu
(74) *Attorney, Agent, or Firm* — IP & T GROUP LLP (57) ABSTRACT

The present disclosure relates to a remote control system for construction equipment, which includes a work apparatus operated according to operation information of a real joystick, that allows construction equipment to be remotely controlled using a mobile device, the remote control system including: a receiver, a virtual joystick interface, a haptic interface, and a transmitter.

4 Claims, 5 Drawing Sheets

REMOTE CONTROL SYSTEM FOR CONSTRUCTION EQUIPMENT

CROSS-REFERENCE TO RELATED APPLICATION

The present application claims priority under 35 U.S.C. § 119(a) to Korean patent application number 10-2021-0185481, filed on Dec. 22, 2021, in the Korean Intellectual Property Office, the entire disclosure of which is incorporated herein by reference.

BACKGROUND

Field of the Invention

The present disclosure relates to a remote control system for construction equipment.

Discussion of Related Art

Construction equipment generally refers to machinery for construction and civil engineering and has a mechanical structure and performance suitable for characteristics of each type of construction such as roadwork, river control work, harbor work, railroad work, and plant construction. That is, due to the diversity of work performed at industrial sites, construction equipment may be classified into excavation equipment, loading equipment, transportation equipment, unloading equipment, compaction equipment, foundation work equipment, and the like. Specifically, construction equipment is a concept encompassing numerous types of equipment such as a bulldozer, an excavator, a loader, a dump truck, and a roller.

The most basic work performed at industrial sites is excavation. During industrial construction, the work of excavating the ground to a certain depth to install various structures or bury a pipe or the like in the ground is mainly performed, and at this time, an excavator is used the most.

The maximum permissible range of 2-axis movement is structurally determined for a joystick provided in the excavator, and the joystick uses a device such as a spring to allow a driver to recognize a movement starting point. Thus, unintended complex movement of a work apparatus can be prevented and precise control thereof is possible.

However, in a case in which the driver cannot directly control the joystick depending on the working environment, for example, in the case of an extremely harmful working environment, it is necessary to remotely control the excavator to perform the work, and accordingly, research and development has been carried out on a remote control system for remotely controlling the excavator.

SUMMARY OF THE INVENTION

The present disclosure is directed to providing a remote control system for construction equipment that implements physical feedback, which can be recognized only during operation of a real joystick, in a mobile application to allow construction equipment (excavator) to be precisely controlled using a mobile device.

One aspect of the present disclosure provides a remote control system for construction equipment that allows construction equipment, which includes a work apparatus in which a boom, an arm, and a bucket operated according to operation information of a real joystick are provided and a turning body mounted on a traveling body to turn the work apparatus, to be remotely controlled using a mobile device, the remote control system including: a receiver provided in the construction equipment and configured to communicate with a controller configured to control movement of the work apparatus according to the operation information of the real joystick; a virtual joystick interface provided in the mobile device and configured to output a virtual joystick, simulating the real joystick, as an image on a display; a haptic interface provided in the mobile device and configured to generate a haptic profile upon the virtual joystick being touched and dragged to operate; and a transmitter provided in the mobile device and configured to transfer operation information of the virtual joystick to the receiver so that the movement of the work apparatus is controlled through the controller.

Specifically, the virtual joystick may include a core which has a circular image and moves in a front-rear direction or a left-right direction by being touched and dragged and an input limit area which has a quadrangular image and limits a range of the movement of the work apparatus, the virtual joystick may consist of a left-side virtual joystick generated on a left side on the display and a right-side virtual joystick generated on a right side on the display, and an initial position of the core may be a center of the input limit area.

Specifically, the virtual joystick may be divided into a dead zone section in which pressure is not generated in a cylinder of the work apparatus, a movement section in which pressure is generated in the cylinder of the work apparatus and work is performed, a motionless section which deviates from a performance range of the work of the work apparatus, a first boundary section between the dead zone section and the movement section, and a second boundary section between the movement section and the motionless section.

Specifically, a first haptic profile which indicates readiness for the work of the work apparatus may be generated in the dead zone section, a second haptic profile which indicates a start of the work of the work apparatus may be generated in the first boundary section, a third haptic profile which indicates that the work of the work apparatus is in progress may be generated in the movement section, a fourth haptic profile which indicates deviation from the performance range of the work of the work apparatus may be generated in the second boundary section, a fifth haptic profile which indicates a risk due to the deviation from the performance range of the work of the work apparatus may be generated in the motionless section, and the first, second, third, fourth, and fifth haptic profiles may be implemented differently from each other.

Specifically, the remote control system may further include a dynamic initialization interface configured to dynamically initialize a point where a touch by a finger starts as a start point (origin) of the virtual joystick, and the dynamic initialization interface may allow a first generation area, in which the left-side virtual joystick is generated, and a second generation area, in which the right-side virtual joystick is generated, to be divided from each other on the display, and upon a touch by a finger within the first and second generation areas, a position of the virtual joystick whose start point (origin) is a point where the touch starts may be set.

Specifically, in a case in which a touch is made within each of the first and second generation areas, the left-side virtual joystick and the right-side virtual joystick may be activated and normally execute a movement command of the work apparatus, and in a case in which a touch is made within only any one of the first and second generation areas, the movement command of the work apparatus may not he executed.

BRIEF DESCRIPTION OF DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The objectives, specific advantages, and novel features of the present disclosure will become more apparent from the following detailed description and exemplary embodiments with reference to the accompanying drawings. In assigning reference numerals to elements in each drawing of this specification, it should be noted that like reference numerals are assigned to like elements wherever possible even when the elements are illustrated in different drawings, In addition, in describing the present disclosure, when detailed description of a known related art is determined as having the possibility of unnecessarily obscuring the gist of the present disclosure, the detailed description thereof will be omitted.

Hereinafter, exemplary embodiments of the present disclosure will be described in detail with reference to the accompanying drawings.

Figure 1:
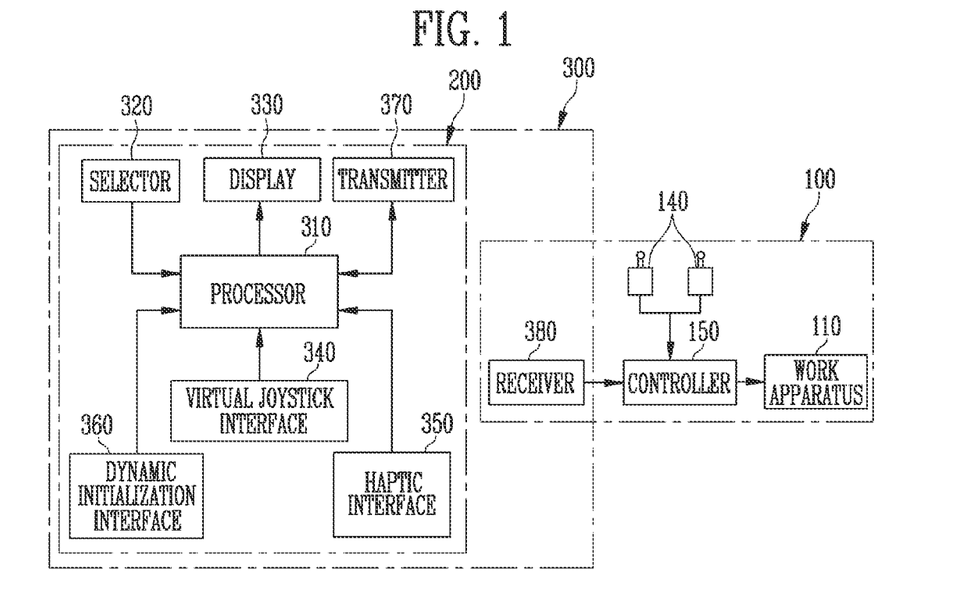
FIG. 1. is a block diagram for describing a remote control system for construction equipment according to one embodiment of the present disclosure.
Figure 2:
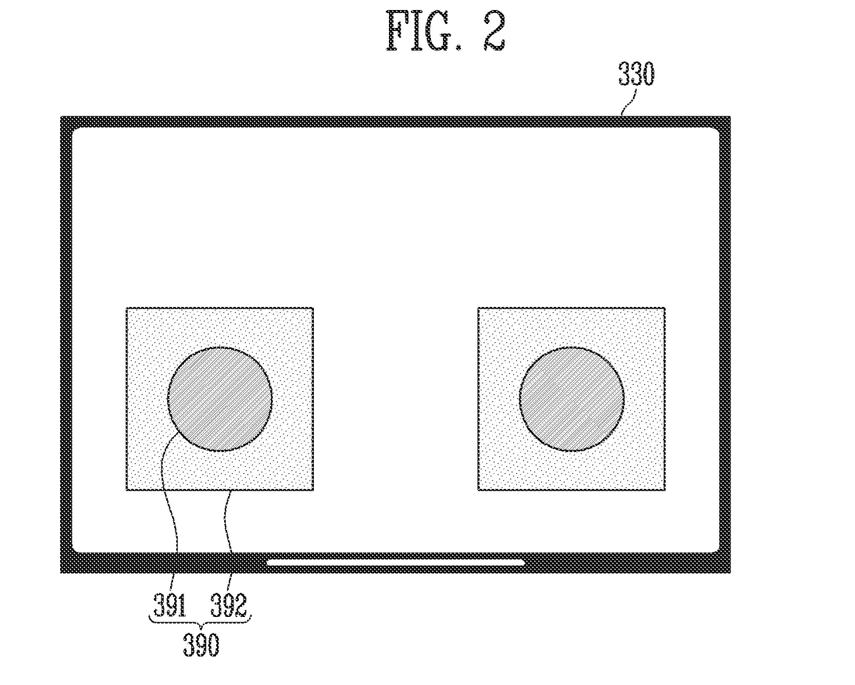
FIG. 2 is a display view illustrating a mobile application joystick interface.
Figure 3:
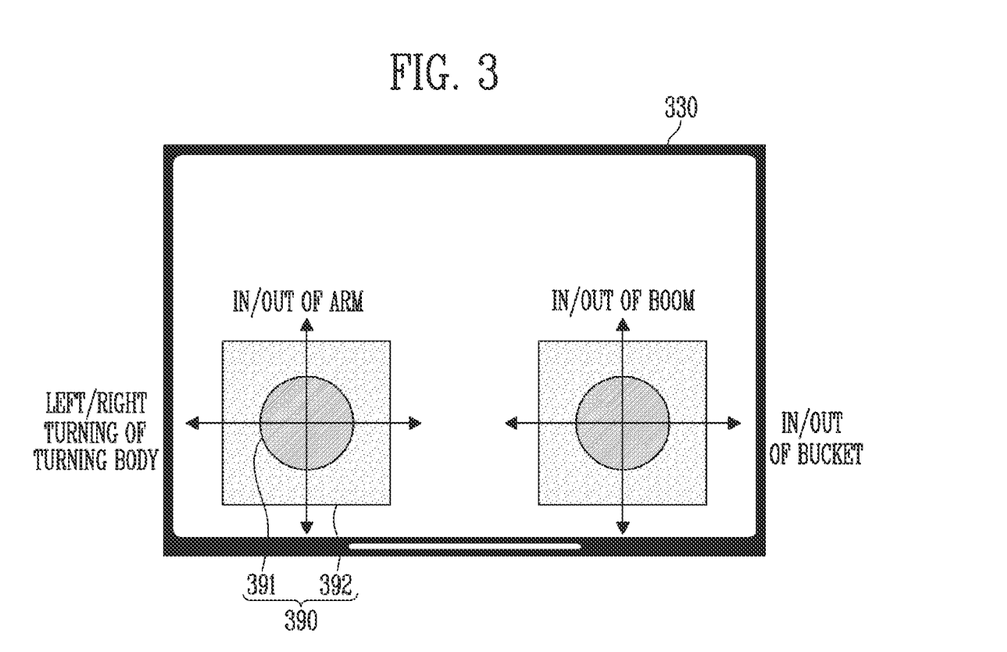
FIG. 3 is a display view for describing operation of a virtual joystick interface.
Figure 4:
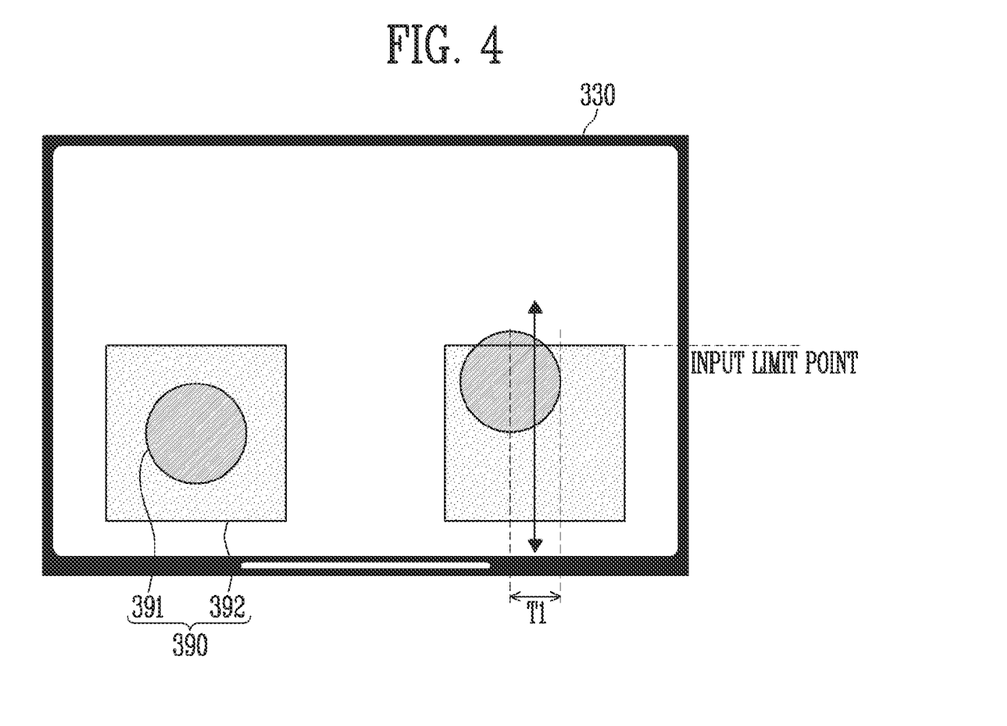
FIG. 4 is a display view for describing the possibility of a touch operation error of the virtual joystick interface.
Figure 5:
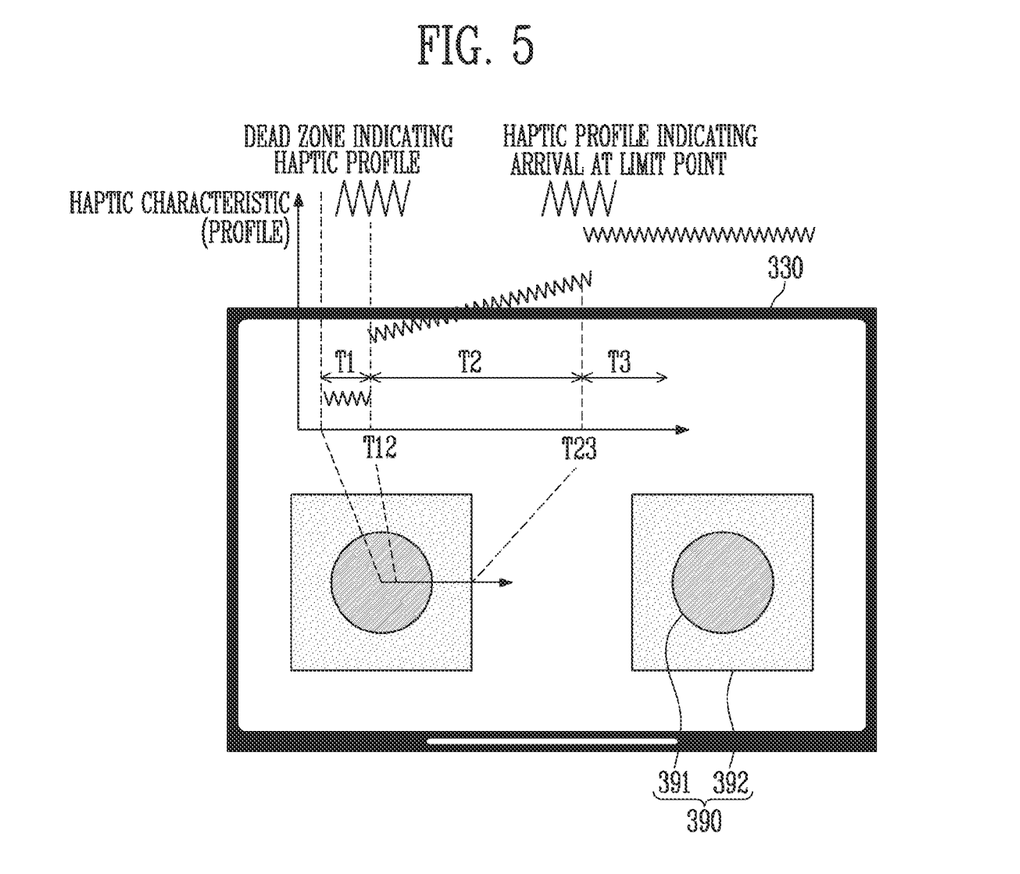
FIG. 5 is a display view for describing haptic profiles according to operation of a virtual joystick when a haptic interface is applied to the virtual joystick interface.
Figure 6:
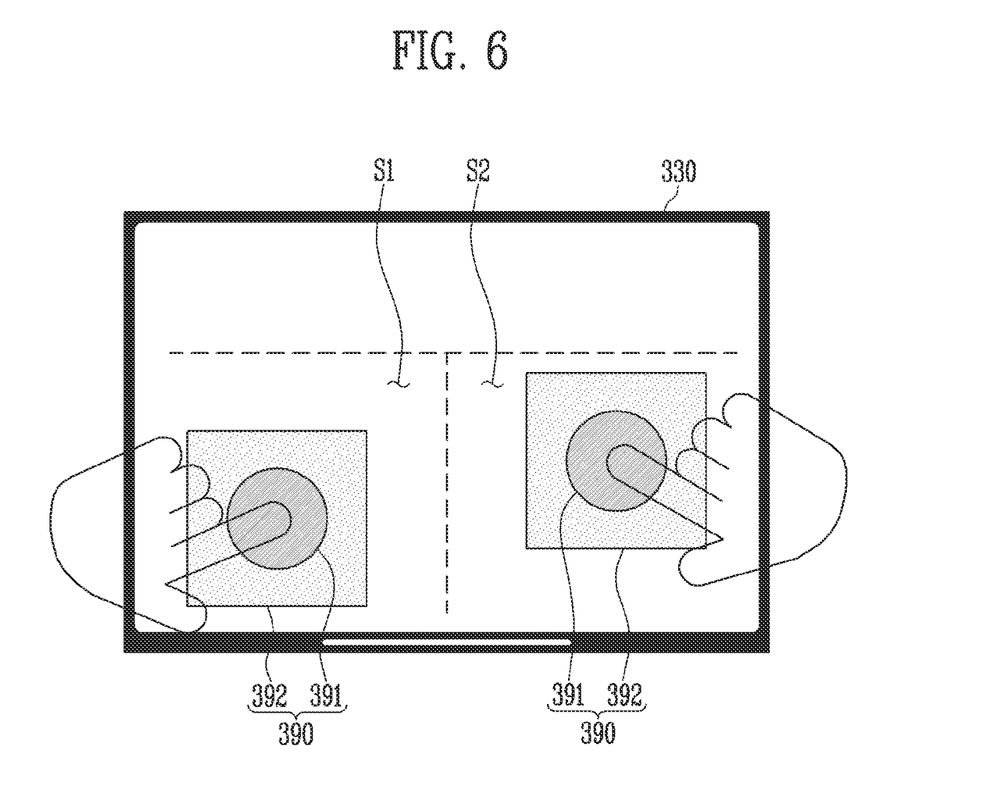
FIG. 6 is a display view for describing application of a dynamic initialization interface to generate the virtual joystick.
Figure 7:
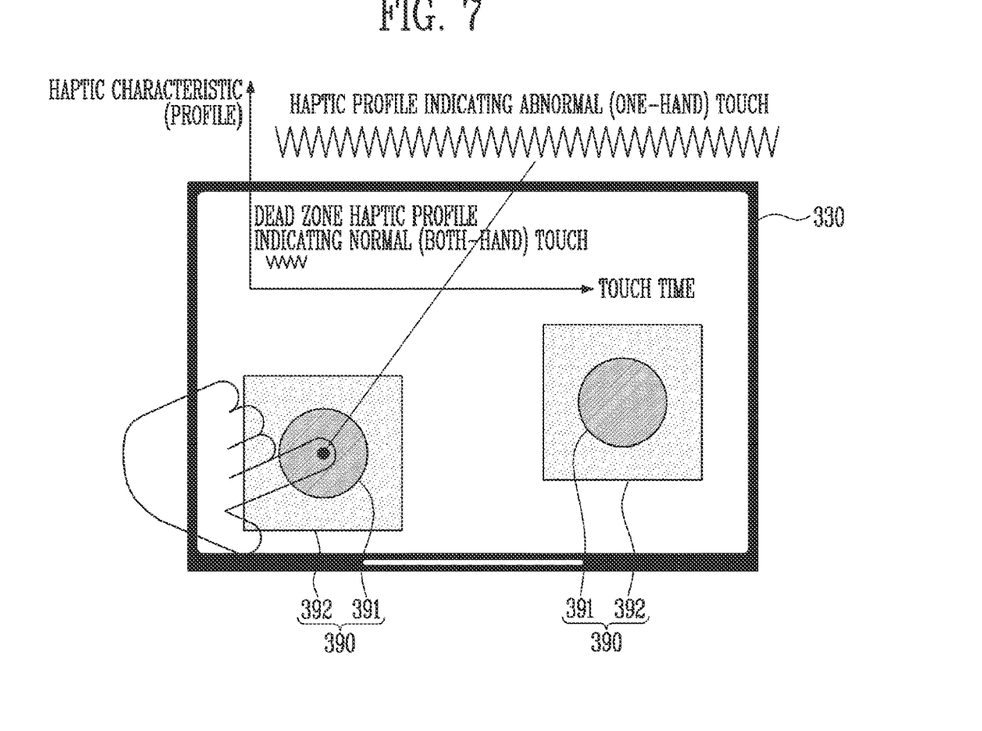
FIG. 7 is a display view for describing a haptic profile that indicates an abnormal touch of the virtual joystick.
Figure 8:
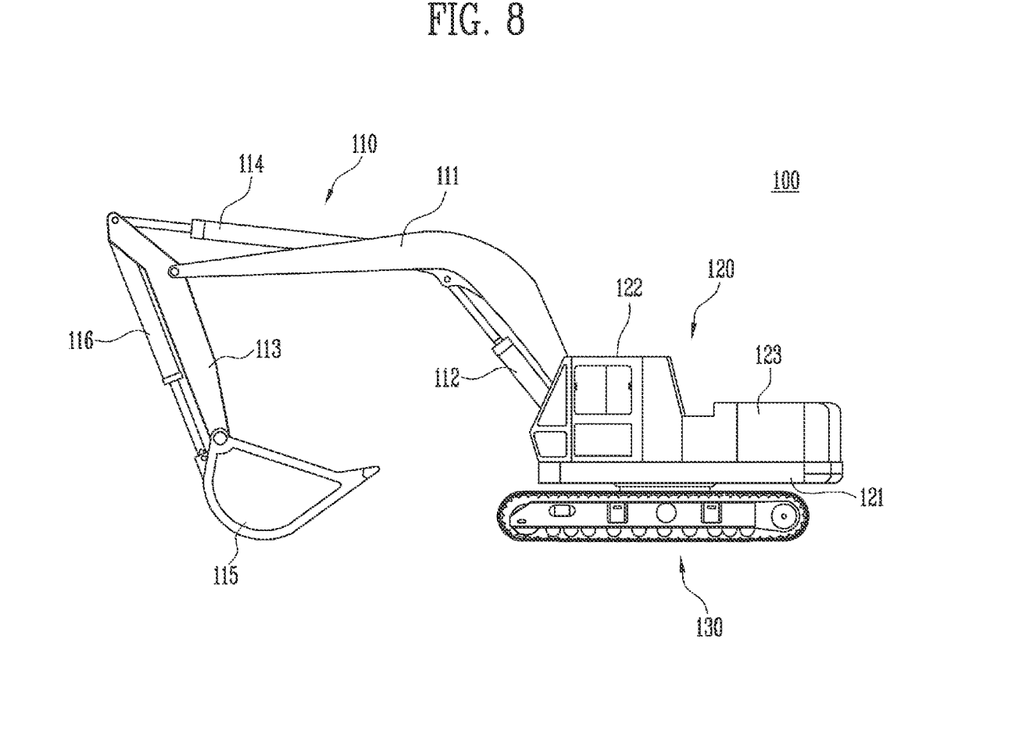
FIG. 8 is a view of construction equipment to which the remote control system of the present disclosure is applied.

FIG. 1 is a block diagram for describing a remote control system for construction equipment according to one embodiment of the present disclosure, FIG. 2 is a display view illustrating a mobile application joystick interface, FIG. 3 is a display view for describing operation of a virtual joystick interface, FIG. 4 is a display view for describing the possibility of a touch operation error of the virtual joystick interface, FIG. 5 is a display view for describing haptic profiles according to operation of a virtual joystick when a haptic interface is applied to the virtual joystick interface, FIG. 6 is a display view for describing application of a dynamic initialization interface to generate the virtual joystick, FIG. 7 is a display view for describing a haptic profile that indicates an abnormal touch of the virtual joystick, and FIG. 8 is a view of construction equipment to which the remote control system of the present disclosure is applied.

As illustrated in FIGS. 1 to 8, a remote control system 300 according to one embodiment of the present disclosure is a system configured to implement physical feedback, which can be recognized only during operation of a real joystick 140 provided in construction equipment 100, in a mobile application and allows the construction equipment 100 to be precisely controlled using a mobile device 200.

The construction equipment 100 to which the remote control system 300 according to one embodiment is applied may be configured to include a work apparatus 110, a turning body 120, and a traveling body 130 as illustrated in FIG. 8.

The construction equipment 100 may be an excavator that performs work such as excavation work of digging the ground at a building or construction site, loading work of transporting earth and sand, crushing work of dismantling a building, and grading work of grading the ground. Although the case in which the construction equipment 100 to which the remote control system 300 is applied is an excavator is described in the present embodiment, it should be noted in advance that the term "construction equipment 100" is used as a meaning encompassing various pieces of equipment that perform work using the real joystick 140.

The work apparatus 110 may be disposed at one side of the construction equipment 100 and may consist of a boom 111, an arm 113, and a bucket 115. As the boom 111 is operated using a boom cylinder 112 and the arm 113 is operated using an arm cylinder 114, the position of the bucket 115 may be adjusted. The bucket 115 may perform detailed work using a bucket cylinder 116.

The turning body 120 may have a front portion connected to the work apparatus 110 and may be mounted on the traveling body 130 to rotate the work apparatus 110 360° using a turning system. The turning body 120 may be configured to include a frame 121 forming a frame structure and a driving room 122 and an engine 123 which are arranged on the frame 121.

In the above, the work apparatus 110 may perform work by operation of the real joystick 140 provided in the driving room 122. The real joystick 140 may be connected to a controller 150 to move the work apparatus 110.

The controller 150 is connected to the real joystick 140 to control movement of the work apparatus 110 using a pre-stored algorithm according to operation information of the real joystick 140. Since the controller 150 may be the same as or similar to existing controllers provided in the construction equipment 100, detailed description thereof will be omitted herein. However, as will be described below, the controller 150 of the present embodiment may also control the movement of the work apparatus 110 according to operation information of a virtual joystick 390 generated by the remote control system 300, identically as when controlling the movement of the work apparatus 110 according to the operation information of the real joystick 140.

The real joystick 140 is provided at the left and right of a driver and controls the work apparatus 110 by operation in two axial directions including the front-rear direction and the left-right direction. The control of the work apparatus 110 using the real joysticks 140 at the left and right of the driver has the following features.

First, the movement of the work apparatus 110 is allocated by the operation in the two axial directions including the front-rear direction and the left-right direction. That is, a left-side real joystick 140 may control left/right turning movement of the turning body 120 and in/out movement of the arm 113, and a right-side real joystick 140 may control in/out movement of the bucket 115 and up/down movement of the boom 111, Second, a certain amount of force is required to move the real joystick 140 in a specific direction from an initial state.

Third, when the corresponding movement is performed to a specific angle from a central position of the real joystick 140, a dead zone in which pressure is not generated in the cylinders 112, 114, and 116 of the work apparatus 110 is present.

Fourth, due to a mechanical characteristic of the real joystick 140, the maximum movement angle in one direction is limited, and the real joystick 140 does not move further even when a driver applies force.

Fifth, since limit points of movement in the two axial directions are independent from each other, an area in which the real joystick 140 can move generally has a square shape.

Sixth, when the driver releases his or her hand (removes the force) from the real joystick 140 during operation of the real joystick 140, the real joystick 140 moves to its initial position due to a restoring force.

As described above, the maximum permissible range of 2-axis movement is structurally determined for the real joystick 140 provided in the construction equipment 100, and the real joystick 140 uses a device such as a spring to allow the driver to recognize a movement starting point (dead zone). Thus, unintended complex movement of the work apparatus 110 can be prevented and precise control thereof is possible.

However, in a case in which the driver cannot directly control the real joystick 140 depending on the working environment, for example, in the case of an extremely harmful working environment, it is necessary to remotely control the construction equipment 100 to perform the work. Hereinafter, the remote control system 300 for remotely controlling the construction equipment 100 will be described.

As illustrated in FIG. 1, the remote control system 300 may include a processor 310, a selector 320, a display 330, a virtual joystick interface 340, and a transmitter 370, which are provided in a mobile device 200, and a receiver 380 provided in the construction equipment 100.

It should be noted that the term "mobile device 200" is used as a meaning encompassing various communication means such as a smartphone, a tablet device, and a laptop.

The processor 310 may be embedded in the mobile device 200 and configured to execute executable program instructions stored in a memory. For example, the processor 310 may communicate with the display 330, the virtual joystick interface 340, a haptic interface 350, a dynamic initialization interface 360, and the transmitter 370 and may generate the virtual joystick 390 on the display 330, execute a program of at least any one of the virtual joystick interface 340, the haptic interface 350, and the dynamic initialization interface 360, or execute a program for transferring operation information of the virtual joystick 390 to the receiver 380 through the transmitter 370.

The selector 320 may allow a function of remotely controlling the construction equipment 100 to be selected among various functions of the mobile device 200 and may be implemented as a button on the mobile device 200 or implemented as an icon on the display 330.

The selector 320 may communicate with the processor 310 and may activate the remote control system 300 so that the virtual joystick 390 is generated on the display 330.

The display 330 may communicate with the processor 310 and, when the remote control system 300 is selected using the selector 320, allow the driver to view the virtual joystick 390, which is formed into an image by the virtual joystick interface 340, by visual inspection.

The virtual joystick interface 340 may communicate with the processor 310 and may, as illustrated in FIG. 2, output the virtual joystick 390 simulating the real joystick 140 as an image on the display 330.

The virtual joystick 390 may be generated on each of a left side and a right side on the display 330 to correspond to the real joysticks 140. When the virtual joystick 390 is selected using the selector 320, a core 391 and an input limit area 392 of the virtual joystick 390 may be formed into images and generated at predetermined positions on the display 330.

The core 391 may be a circular image, and the driver may operate the core 391 by touching and dragging the core 391 so that the core 391 moves in the front-rear direction or left-right direction. The work apparatus 110 moves according to the movement of the core 391.

The input limit area 392 may be a quadrangular image having a size accommodating the core 391 and may limit a movement range of the work apparatus 110. Unlike the core 391, the input limit area 392 has its range fixed to a predetermined area.

An initial position of the core 391 may be a center of the input limit area 392.

Like the real joysticks 140 described above, the virtual joysticks 390 can be operated in the two axial directions including the front-rear direction and the left-right direction, and as illustrated in FIG. 3, the virtual joysticks 390 may consist of a left-side virtual joystick 390 generated on the left side on the display 330 and a right-side virtual joystick 390 generated on the right side on the display 330.

The left-side virtual joystick 390 may control the left/right turning movement of the turning body 120 and the in/out movement of the arm 113, and the right-side virtual joystick 390 may control the in/out movement of the bucket 115 and the up/down movement of the boom 111. In this way, the virtual joysticks 390 allow the driver to remotely control the work apparatus 110 to perform the work in a working environment in which the driver cannot directly control the work apparatus 110 using the real joysticks 140 in the driving room 122.

Operation information of the virtual joysticks 390 is transferred to the transmitter 370 through the processor 310, The transmitter 370 may communicate with the processor 310, The transmitter 370 transfers the operation information of the virtual joysticks 390 to the receiver 380 provided in the construction equipment 100. The transmitter 370 may transfer the operation information of the virtual joysticks 390 to the receiver 380 to allow movement of the work apparatus 110 to be controlled through the controller 150.

The transmitter 370 may be configured using a smartphone or a tablet device and a mobile application including a remote control graphical interface but is not limited thereto.

The receiver 380 may communicate with the controller 150. The receiver 380 transfers the operation information of the virtual joysticks 390, which is transferred from the transmitter 370, to the controller 150 so that the work apparatus 110 moves according to the operation of the virtual joysticks 390.

The receiver 380 may be configured using an access point (AP), an Ethernet packet serialize device server, and a controller area network (CAN) message transmitter configured to receive a wireless signal by Wi-Fi, Bluetooth, long-term evolution (LTE), fifth generation (5 G) or the like but is not limited thereto.

In the above, the virtual joysticks 390 generated by the virtual joystick interface 340 are touched and dragged to control the work apparatus 110 and thus have the following problems which will be described below with reference to FIGS. 3 and 4.

First, although the second and third features of the real joysticks 140 described above allow the driver to effectively execute commands for two or more movements (complex movement) by controlling the real joysticks 140 by relying on the senses of the hands, the touch-type virtual joysticks 390 have a problem that the driver has to visually check the position of the core 391 of each virtual joystick 390.

Second, although the fourth and fifth features of the real joysticks 140 described above allow the driver to effectively perform precise control of the work apparatus 110 even at a point where the work apparatus 110 moves at the maximum speed, the touch-type virtual joysticks 390 have a problem that, when the core 391 is touched and dragged in one direction, a touch by a fingertip may deviate from the input limit area 392 of the virtual joystick 390 due to a slip between the screen and the finger, and in this case, as in the right-side virtual joystick 390 of FIG. 4, the touch by the fingertip is placed outside the input limit area 392 despite the core 391 being placed on an edge portion of the input limit area 392, which makes it impossible for the driver to directly drag the core 391 and precisely control the work apparatus 110.

Third, although the sixth feature of the real joysticks 140 described above ensures that, upon the driver starting to operate the real joysticks 140, the real joysticks 140 always start from initial positions thereof even without the driver visually checking the positions of the real joysticks 140, the touch-type virtual joysticks 390 have a problem that, since positions thereof are statically fixed, the driver has to visually check the position of the core 391 of each virtual joystick 390 upon a start of operation, and even after checking, it is difficult for the driver to accurately touch an initial start point (origin) of each virtual joystick 390.

Fourth, not only is it difficult to implement the second feature of the real joysticks 140 described above in a mobile application touch interface, but also there is a problem that, due to a limitation of the mobile application touch interface such as the third problem of the virtual joysticks 390 described above, an accident may occur due to high-speed movement caused by an unintended touch by the driver.

As described above, the virtual joysticks 390 simulating the real joysticks 140 have problems that, due to the absence of a mechanical device, it is difficult to check a state of the virtual joysticks 390 while looking at the construction equipment 100 performing the work, in a case in which a dead zone section T1 is absent in the virtual joysticks 390, single action (e.g., stopping the bucket during upward movement of the boom) of the work apparatus 110 is not possible, and in a case in which checking the state of the virtual joysticks 390 in real time is not possible, it is difficult to precisely control the work apparatus 110.

Thus, in order to address the above-described problems that occur when only the virtual joystick interface 340 is applied, as illustrated in FIG. 1, the remote control system 300 of the present embodiment may further include the haptic interface 350 which will be described below with reference to FIG. 5, in addition to including the virtual joystick interface 340.

In order to perform control while recognizing the dead zone section T1 using the virtual joysticks 390 to address the first and second problems described above, the driver has to remotely control the construction equipment 100 while visually checking the virtual joysticks 390 output through the display 330. However, since it is not possible, due to circumstances, to control the virtual joysticks 390 while looking at the construction equipment 100, the remote control system 300 of the present embodiment builds the haptic interface 350 in the mobile device 200 to allow the driver to recognize the state (position) of the core 391 of each virtual joystick 390 using a sense of touch by hand and an auditory sense.

As the haptic interface 350 is built, the driver may recognize a haptic profile from a start position of the core 391 of each virtual joystick (the center of the input limit area 392) to a point where movement occurs at the maximum speed.

Hereinafter, although the haptic profile is described as differences in intensity and change of vibration or sound in the present embodiment, the haptic profile is not limited thereto, and, of course, various other haptic profiles that may assist the driver in recognizing the state may be applied.

The haptic profile may communicate with the processor 310 and may generate profiles that may be distinguished according to the positions of the core 391 of each virtual joystick.

Specifically, the virtual joystick 390 may be divided into the dead zone section T1 in which pressure is not generated in the cylinders 112, 114, and 116 of the work apparatus 110, a movement section T2 in which pressure is generated in the cylinders 112, 114, and 116 of the work apparatus 110 and work is performed, a motionless section T3 which deviates from a performance range of the work of the work apparatus 110, a first boundary section T12 between the dead zone section T1 and the movement section T2, and a second boundary section T23 between the movement section T2 and the motionless section T3. Here, the haptic profile may vary for each section.

A haptic profile of the dead zone section T1 is a first haptic profile which indicates readiness for the work of the work apparatus 110 and in which a change does not occur in the intensity of vibration or sound. The first haptic profile may be generated from the moment the driver touches the core 391 of the virtual joystick at its initial position until the driver drags the core 391 to the first boundary section T12 where the dead zone section T1 ends. Here, the dead zone section T1 may be set to a certain distance from the center of the input limit area 392.

A haptic profile of the first boundary section T12 is a second haptic profile which indicates a start of the work of the work apparatus 110 and in which the intensity of vibration or sound instantaneously increases as compared to the first haptic profile. The second haptic profile may be instantaneously generated when the core 391 of the virtual joystick is positioned at a point where the dead zone section T1 ends.

A haptic profile of the movement section T2 is a third haptic profile which indicates that the work of the work apparatus 110 is in progress and in which the intensity of vibration or sound gradually increases from the second haptic profile. The third haptic profile may be generated while the driver drags the core 391 from the first boundary section T12 to the second boundary section T23 where the movement section T2 ends. Here, the movement section T2 may be set to a distance from the point where the dead zone section T1 ends to an edge of the input limit area 392. In the third haptic profile, the intensity of vibration or sound changes proportional to the movement speed when movement occurs in the movement section T2.

A haptic profile of the second boundary section T23 is a fourth haptic profile which indicates deviation from the performance range of the work of the work apparatus 110 and in which the intensity of vibration or sound instantaneously increases as compared to the third haptic profile. The fourth haptic profile may be instantaneously generated when the core 391 of the virtual joystick is positioned at a point where the movement section T2 ends.

A haptic profile of the motionless section T3 is a fifth haptic profile which indicates a risk due to the deviation from the performance range of the work of the work apparatus 110 to the driver and in which the intensity of vibration or sound is maintained at the highest intensity of vibration or sound of the fourth haptic profile. The fifth haptic profile may be generated while the driver drags the core 391 of the virtual joystick at a portion deviating from the input limit area 392.

As described above, the first, second, third, fourth, and fifth haptic profiles generated for each section are implemented differently from each other to be easily recognized by the driver.

In order to allow the driver to even more easily operate the virtual joystick interface 340 while addressing the above-described problems that occur when only the virtual joystick interface 340 is applied, as illustrated in FIG. 1, the remote control system 300 of the present embodiment may further include the dynamic initialization interface 360 which will be described below with reference to FIG. 6, in addition to including the virtual joystick interface 340 and the haptic interface 350.

By applying the dynamic initialization interface 360 configured to dynamically initialize a point where a touch by a finger starts as a start point (origin) of the virtual joystick 390 in order to address the third and fourth problems described above, movement always starts from the initial position (origin) of the virtual joystick 390 even without the driver visually checking the virtual joystick 390 output through the display 330 of the mobile device 200, prior to starting a touch.

The dynamic initialization interface 360 may communicate with the processor 310 and may allow a first generation area S1, in which the left-side virtual joystick 390 is generated, and a second generation area S2, in which the right-side virtual joystick 390 is generated, to be divided from each other on the display 330. Upon the driver's touch by a finger within the first and second generation areas S1 and S2, a position of the virtual joystick 390 whose start point (origin) is a point where the touch starts may be set.

In a state in which the left-side and right-side virtual joysticks 390 generated in each of the first and second generation areas S1 and S2 are generated as mages at predetermined positions on the display 330 as illustrated in FIG. 2, when the driver touches any point within each of the first and second generation areas S1 and S2, the left-side and right-side virtual joysticks 390 move from the initial positions (see FIGS. 2) to positions touched by the driver's fingers as illustrated in FIG. 6, and the positions to which the left-side and right-side virtual joysticks 390 move become start points thereof.

Also, in a state in which the left-side and right-side virtual joysticks 390 generated in each of the first and second generation areas S1 and S2 are not initially generated as images in each of the first and second generation areas S1 and S2, when the driver touches any point within each of the first and second generation areas S1 and S2 by a finger, the left-side and right-side virtual joysticks 390 may be generated as images at positions touched by the driver's fingers, and the positions at which the left-side and right-side virtual joysticks 390 are generated become start points thereof.

In order to address the fourth problem described above, the remote control system 300 of the present embodiment may be configured so that the left-side and right-side virtual joysticks 390 are activated to normally execute a movement command of the work apparatus 110 only in a case in which a touch is made within each of the first and second generation areas S1 and S2 by a finger of each hand, and the movement command of the work apparatus 110 is not executed in a case in which a touch is made within only any one of the first and second generation areas S1 and S2 by a finger of any one hand. This will be described below with reference to FIG. 7.

In a case In which a touch is made by a finger within only any one of the first and second generation areas S1 and S2, e.g., the first generation area S1 as illustrated in FIG. 7, such that only the left-side virtual joystick 390 is activated and the right-side virtual joystick 390 is inactivated due to a touch not being made within the second generation area S2, a sixth haptic profile may be generated in the first generation area S1 to allow recognition of an abnormal touch state.

Vibration or sound different from that of the first haptic profile of the dead zone section T1 described above may be applied to the sixth haptic profile which indicates the abnormal touch state. When the sixth haptic profile is generated, the driver may recognize the abnormal touch state and touch the untouched right-side virtual joystick 390. Then, the sixth haptic profile is changed to the first haptic profile, which allows the movement command of the work apparatus 110 to be normally executed.

A remote control system for construction equipment according to the present disclosure can apply a haptic interface to a mobile device-based remote control application not having a physical feedback system and thus can improve an operation feeling and work efficiency.

Also, the remote control system for construction equipment according to the present disclosure can improve mobile application-based remote control operation performance and thus can replace a hardware controller (transmitter) and provide additional functions at a low cost as compared to existing general remote control systems.

The present disclosure has been described above on the basis of embodiments thereof, but the embodiments are merely examples and are not intended to limit the present disclosure. Those of ordinary skill in the art to which the present disclosure pertains should understand that various combinations or modifications and applications that are not described herein are possible within the scope not departing from essential technical contents of the present embodiments. Therefore, technical contents relating to modifications and applications that may be easily derived from the embodiments of the present disclosure should be construed as belonging to the scope of the present disclosure.

What is claimed is:

1. A remote control system for construction equipment that allows construction equipment, which includes a work apparatus in which a boom, an arm, and a bucket operated according to operation information of a real joystick are provided and a turning body mounted on a traveling body to turn the work apparatus, to be remotely controlled using a mobile device, the remote control system comprising:

a receiver provided in the construction equipment and configured to communicate with a controller configured to control movement of the work apparatus according to the operation information of the real joystick;

a virtual joystick interface provided in the mobile device and configured to output a virtual joystick, simulating the real joystick, as an image on a display;

a haptic interface provided in the mobile device and configured to generate a haptic profile upon the virtual joystick being touched and dragged to operate; and a transmitter provided in the mobile device and configured to transfer operation information of the virtual joystick to the receiver so that the movement of the work apparatus is controlled through the controller, wherein the virtual joystick is divided into a dead zone section in which pressure is not generated in a cylinder of the work apparatus, a movement section in which pressure is generated in the cylinder of the work apparatus and work is performed, a motionless section which deviates from a performance range of the work of the work apparatus, a first boundary section between the dead zone section and the movement section, and a second boundary section between the movement section and the motionless section, a first haptic profile which indicates readiness for the work of the work apparatus is generated in the dead zone section, a second haptic profile which indicates a start of the work of the work apparatus is generated in the first boundary section, a third haptic profile which indicates that the work of the work apparatus is in progress is generated in the movement section, a fourth haptic profile which indicates deviation from the performance range of the work of the work apparatus is generated in the second boundary section, a fifth haptic profile which indicates a risk due to the deviation from the performance range of the work of the work apparatus is generated in the motionless section, and the first, second, third, fourth, and fifth haptic profiles are implemented differently from each other.

2. The remote control system of claim 1, wherein the virtual joystick includes:

a core which has a circular image and moves in a front-rear direction or a left-right direction by being touched and dragged; and an input limit area which has a quadrangular image and limits a range of the movement of the work apparatus, wherein the virtual joystick consists of a left-side virtual joystick generated on a left side on the display and a right-side virtual joystick generated on a right side on the display, and an initial position of the core is a center of the input limit area.

3. The remote control system of claim 2, further comprising a dynamic initialization interface configured to dynamically initialize a point where a touch by a finger starts as a start point (origin) of the virtual joystick, wherein the dynamic initialization interface allows a first generation area, in which the left-side virtual joystick is generated, and a second generation area, in which the right-side virtual joystick is generated, to be divided from each other on the display, and upon a touch by a finger within the first and second generation areas, a position of the virtual joystick whose start point (origin) is a point where the touch starts is set.

4. The remote control system of claim 3, wherein:

in a case in which a touch is made within each of the first and second generation areas, the left-side virtual joystick and the right-side virtual joystick are activated and normally execute a movement command of the work apparatus; and in a case in which a touch is made within only any one of the first and second generation areas, the movement command of the work apparatus not executed.

* * * * *